United States Patent [19]

Turley et al.

[11] 4,260,728
[45] Apr. 7, 1981

[54] PREPARATION OF NONCELLULAR POLYURETHANE COMPOSITIONS

[75] Inventors: Richard J. Turley, Orange; David R. MacFarland, Cheshire, both of Conn.

[73] Assignee: Olin Corporation, New Haven, Conn.

[21] Appl. No.: 146,829

[22] Filed: May 5, 1980

[51] Int. Cl.³ .................... C08G 18/50; C08G 18/62
[52] U.S. Cl. ...................... 528/57; 528/67; 528/75; 528/906
[58] Field of Search ............... 528/57, 75; 521/171

[56] References Cited

U.S. PATENT DOCUMENTS

| 3,036,045 | 5/1962 | Short et al. | 528/75 |
|---|---|---|---|
| 3,055,952 | 9/1962 | Goldberg | 528/75 |
| 3,061,574 | 10/1962 | Smith | 528/75 |
| 3,629,172 | 12/1971 | Jones | 528/75 |
| 3,714,265 | 1/1973 | Bader et al. | 528/75 |
| 3,789,045 | 1/1974 | Coury et al. | 528/57 |
| 3,860,565 | 1/1975 | Barber | 528/57 |
| 3,963,680 | 6/1976 | O'Keefe et al. | 528/57 |
| 4,080,345 | 3/1978 | Riemhofer | 528/57 |

OTHER PUBLICATIONS

Saunders et al., Polyurethanes, Part I, pp. 94–97, Interscience, N.Y. (1962).

*Primary Examiner*—H. S. Cockeram
*Attorney, Agent, or Firm*—William D. Sabo

[57] ABSTRACT

Noncellular polyurethane compositions are prepared by reacting an organic polyisocyanate with select chlorine-containing polyols in the presence of a catalytic amount of a metal carboxylate compound. These reactions produce noncellular polyurethanes which are useful as coatings and castings.

14 Claims, No Drawings

PREPARATION OF NONCELLULAR POLYURETHANE COMPOSITIONS

This invention relates to a catalytic process for preparing chlorinated noncellular polyurethanes, and, more particularly, to a process for preparing the same by catalyzing the reaction of organic polyisocyanates with select chlorine-containing polyols.

The production of noncellular polyurethanes is achieved by reacting organic polyisocyanates with polyols; usually a catalyst is employed to effect or promote the reaction. Typical catalysts that can be used include amines and tin compounds. However, these catalysts are not effective in catalyzing the reaction when the polyol is a chlorine-containing polyol, such as that described hereinbelow. Thus, there is a need in the art for a process for preparing noncellular polyurethanes when chlorine-containing polyols are used as the polyol reactant.

It has now been discovered that chlorinated noncellular polyurethane compositions can be produced under relatively mild reaction conditions using select chlorine-containing polyols by reacting such polyols with organic polyisocyanates in the presence of an alkali or alkaline earth metal salt of a carboxylic acid. This discovery was unexpected, since such salt compounds are normally effective as catalysts to induce trimerization of isocyanates to isocyanurates. See Saunders and Frisch, *Polyurethanes: Chemistry and Technology*, Part I, pages 94–97, Interscience Publishers, New York (1962); U.S. Pat. No. 3,860,565, issued on Jan. 14, 1975 to Barber, Jr.; and U.S. Pat. No. 3,963,680, issued on June 15, 1976 to O'Keefe et al. Pursuant to the process of the present invention, only trace amounts of isocyanurates are obtained, and this result was surprising because of the teachings of the prior art.

The polyol employed in the process of the present invention is a select chlorine-containing polyol, and it is characterized by having at least one (2,2-dichlorovinyl) ethylene group in the polyol chain. The (2,2-dichlorovinyl) ethylene group may be represented by Formula I as follows:

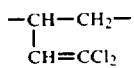

These chlorine-containing polyols usually contain an average of about 2–8, preferably 2–4, and more preferably 2–3, hydroxy groups. They vary in molecular weight over a wide range such as from about 158 to about 9,600, and preferably about 330–5,000. Furthermore, as indicated above, a critical feature of these polyols is that they must contain at least one (2,2-dichlorovinyl) ethylene group in the molecule. Illustratively, depending on the number of hydroxy groups in the polyol, it may contain about 1–40, and preferably about 2–30 (2,2-dichlorovinyl) ethylene groups in the molecule. In accordance with the more preferred embodiments of the invention, the chlorine-containing polyol should contain about 0.1–6, and still more preferably about 1–5, (2,2-dichlorovinyl) ethylene groups per every hydroxyl group.

The chlorine-containing polyols used according to the invention can be prepared by condensing a polyhydroxy initiator with 4,4-dichloro-3-butene-1,2-epoxide or a mixture thereof with a halogen-free epoxide using conventional random or step-wise oxyalkylation techniques. An alternative route is a two-step method which comprises (1) condensing 4,4,4-trichloro-1,2-epoxybutane with a polyhydroxy initiator to form an intermediate chlorinated polyol condensate and then (2) dehydrochlorinating the condensate. This two-step method, which represents a preferred route for preparing the chlorine-containing polyols, is described in more detail hereinbelow. Furthermore, in accordance with the invention, the chlorine-containing polyols can also comprise a mixture of the product of the two-step method with the intermediate chlorinated polyol condensate obtained after following the first step of the method.

In utilizing the two-step method, the 4,4,4-trichloro-1,2-epoxybutane, which is first condensed with the polyhydroxy initiator, may be used in purified form or as a crude product of the dehydrohalogenation of 4,4,4-trichloro-2-halobutanol. Such crude product is described in U.S. Pat. No. 3,847,844, issued Nov. 12, 1974 to Fuzesi et al, the entire disclosure of which is incorporated herein by reference. It is thus to be understood that the term "4,4,4-trichloro-1,2-epoxybutane", as used in the specification and claims herein, includes either form of this compound. For brevity, the 4,4,4-trichloro-1,2-epoxybutane is hereinafter referred to as "TCBO".

The TCBO may be used alone or, pursuant to one preferred embodiment of the invention, in combination with varying proportions of a halogen-free epoxide such as ethylene oxide, propylene oxide, and butylene oxide. In accordance with this embodiment, the halogen-free epoxide, of which ethylene oxide and propylene oxide are preferred, may be used concurrently with the TCBO, i.e., random oxyalkylation, or step-wise, i.e., block oxyalkylation before or after the reaction of the TCBO with the polyhydroxy initiator. These random and step-wise oxyalkylation techniques are well known and conventionally used in the prior art. In general, step-wise oxyalkylation is preferred wherein the TCBO is first condensed with the polyhydroxy initiator, the resulting condensate being thereafter "topped" with the halogen-free epoxide.

The polyhydroxy initiator used to prepare the chlorine-containing polyol can be any compound having from 2 to 8 hydroxy groups or a mixture of two or more such compounds. Illustrative polyhydroxy compounds include ethylene glycol, propylene glycol, butylene glycol, glycerol, trimethylolpropane, triethylolpropane, sorbitol, pentaerythritol, dextrose (hydrous or anhydrous), sucrose, methyl glucoside, mixtures thereof and the like. The polyhydroxy initiator preferably contains an average of 2–6, and still more preferably 2–3, hdyroxy groups. Illustrative such initiators are ethylene glycol, propylene glycol, butylene glycol, glycerol, trimethylolpropane, triethylolpropane and mixtures thereof.

Although the condensation reaction of the TCBO with the polyhydroxy initiator may proceed in the absence of a catalyst, the use of a catalyst is preferred. Any acidic catalyst which is known in the art to promote this type of a rection may be used. A large variety of such catalysts, as illustrated by the Lewis acid catalyst, can be used. These include, for example, boron trifluoride and its etherate derivatives, ferric chloride, ferrous chloride, stannic chloride, titanic tetrachloride, antimony pentachloride, aluminum chloride, aluminum bromide, triethyl aluminum, zinc chloride, zinc bromide, tetrabutyl titanate and so forth. The use of boron trifluoride and its etherate derivatives is particularly preferred. Small or catalytic proportions of the acid catalyst are employed as will serve to promote the condensation reaction.

The acid catalyzed condensation is carried out at any suitable temperature which is effective in bringing about reaction of the TCBO with the polyhydroxy initiator without otherwise adversely affecting the reaction or the product thereof. Temperatures within the range of about 30° C. to about 200° C. are illustrative. In effecting the condensation reaction, such relative proportions of reactants are employed as to provide at least 1 mole of TCBO per mole of polyhydroxy initiator. In accordance with the more preferred embodiments of the invention, the TCBO is employed in a proportion of about 0.1 to about 6, and still more preferably about 1-5, moles per each hydroxy group in the polyhydroxy initiator. Where a halogen-free epoxide is also used, the proportion of this can be varied over a wide range such as from about 0.1 to about 10, preferably about 0.2-5, and most preferably about 0.4-1, moles per every mole of TCBO that is used.

As a result of the condensation of the polyhydroxy initiator with TCBO or a mixture thereof with a halogen-free epoxide, an intermediate chlorinated polyol condensate is obtained. This is then subjected to dehydrochlorination by reaction with a base such as sodium or potassium hydroxide. Preferably, the base is employed in a proportion of 1 mole per every mole of TCBO that has been condensed with the polyhydroxy initiator. It is also preferred to carry out the reaction in the presence of an organic solvent such as methanol. Due to the exothermic nature of the reaction, the addition of the base to the intermediate polyol condensate is effected gradually. Also, it may be advantageous to use a cooling bath to more effectively control the temperatures of the reaction which is preferably effected at a temperature of about 20°-40° C.

Upon completion of the dehydrochlorination, a reaction product mixture results which will be comprised of the chlorine-containing polyol, salt, e.g., NaCl or KCl, water and solvent if such was used. The salt can be removed by a simple water wash. The remaining mixture, after being neutralized with dilute acid, is then stripped of volatiles, i.e., by-product water and solvent if such was used, leaving a chlorine-containing polyol product which would be ready for use according to the invention.

The organic polyisocyanate used in preparing the polyurethane composition of the invention preferably has a functionality of 2-4, and it most preferably has a functionality of 2-3. Suitable polyisocyanate compounds for the process of this invention include: toluene diisocyanate, such as the 4:1 and 65:35 mixtures of the 2,4- and 2,6-isomers, methylene bis(phenylisocyanate), 1,5-naphthalene diisocyanate, 1,3,-phenylene diisocyanate, the xylylene diisocyanates, 3,3'-bitoluene diisocyanate, the polymethylene polyphenylisocyanates, hexamethylene diisocyanate, propylene diisocyanate, mixtures thereof and the like. In practice, certain aliphatic-aromatic polyisocyanates, such as toluene diisocyanate, methylene bis(phenylisocyanate), the polymethylene polyphenylisocyanates and mixtures thereof are preferred due to the fact that these materials are readily available commercially and have gained wide acceptance for use in the production of polyurethanes. The most preferred polyisocyanates used in the practice of the present invention are toluene diisocyanate and methylene bis(phenylisocyanate).

The catalyst compounds that are useful in the process of this invention are metal carboxylate compounds which are either alkali or alkaline earth metal salts of carboxylic acids. However, it should be noted that a mixture of two or more of such compounds may be used. The metal or cation part of the salt includes the metals which are contained in both Groups I and II of the Periodic Table. Preferred embodiments utilize as the metal part of the catalyst, the following metals: lithium, sodium, potassium, magnesium or calcium. The most preferred metals are sodium and potassium. The carboxylic acid or anion part of the salt can be derived from either aliphatic or aromatic carboxylic acids, and it is preferably derived from aliphatic carboxylic acids having up to 18, and preferably 1-6, carbons. Examples of suitable carboxylic acids from which the anion part of the salt may be derived are the following: acetic, propionic, butyric, stearic, benzoic or naphthoic. It should be understood, however, that the anion part of the salt may be derived from these and other equivalent acids including other aliphatic and aromatic acids which may be substituted with conventional inert substituents such as, for example, halogen, nitro and the like. The most preferred catalysts are sodium acetate, potassium acetate and mixtures thereof.

The metal carboxylate compounds can be prepared in conventional fashion by techniques well known to those skilled in the art. Examples of methods which can be followed in preparing such salt compounds can be found in Morrison and Boyd, *Organic Chemistry*, second edition, pages 589 and 593-601, published by Allyn and Bacon, Inc. (1966).

The catalyst, be it a single compound as disclosed herein or a combination of such compounds, may be used in any suitable proportion which is effective in catalyzing the reaction. Thus, the term "catalytic amount" as used in the specification and claims herein, is intended to encompass any such proportion. For illustration, the catalytic proportion may range from about 0.05 to about 1.0, and more commonly about 0.1 to about 0.4 percent, by weight, based on the polyol. The amount of catalyst used in the practice of this invention will depend upon the particular salt compound utilized and also upon the particular reactants and the reaction conditions employed.

In accordance with the process of the invention, the metal carboxylate compounds are used as catalysts in preparing chlorinated polyurethanes. First, a catalytic amount of the metal salt is added to the select chlorine-containing polyol. This combination is then preferably heated to a temperature in the range of about 40° to 70° C., and more preferably in the range of about 50° to 60° C. Next, the heated polyol containing the salt is simply added to, and mixed with, the organic polyisocyanate. Thereafter, the mixture is allowed to cure into a hard substance. Ordinarily, such curing will take place at room temperature, so that heating is not necessary, although the use of heat may be preferred in actual practice in order to enhance or speed up the curing process. Generally, when it is desired to cure the product at an elevated temperature, a temperature in the range of about 30° to 200° C., and more preferably in the range of about 50° to 120° C., is employed. The process of this invention provides polyurethane compositions which gel and cure relatively rapidly to noncellular polyurethane compositions.

Upon curing, the polyurethane composition exhibits desirable flame retardance and hardness properties. As such, it is used to advantage, according to the method of the invention, as an improved coating or cast elastomer. For example, by virtue of its flame retardance properties, it is particularly suited for use in coating combustible materials. It is also useful in numerous casting applications, such as roller skate wheels, conveyor rollers, automobile front and rear ends, bumpers, etc. where impact resistance is important.

The following examples will serve to illustrate the preparation of noncellular polyurethane compositions in accordance with the process of this invention. In the examples, three different polyols are employed to illustrate the invention. Two of the three polyols, which are identified as Polyols A and B, are products of dehydrochlorinating various intermediate chlorinated polyol condensates. These condensates in turn had been prepared by a conventional oxyalkylation method using a boron trifluoride etherate as a catalyst. The identities and relative molar proportions of the reactants used in preparing each intermediate condensate are given below.

| Polyol | Preparation of Intermediate Polyol Condensate |
|---|---|
| A | One mole of glycerol condensed first with 8 moles of TCBO and then with 4 moles of ethylene oxide |
| B | One mole of ethylene glycol condensed first with 8 moles of TCBO and then with 4 moles of ethylene oxide |

To illustrate the preparation of the dehydrochlorinated chlorine-containing polyol from the intermediate polyol condensate, the following procedure was used in preparing Polyol A, which procedure applies generally to the preparation of Polyol B. Five hundred grams of the intermediate chlorinated polyol condensate were reacted with 2.7 moles of KOH which was used as a solution thereof in 850 mls. of methanol. The addition of the KOH was gradual and a cooling bath was used so as to maintain a temperature of 20°-30° C. The precipitated KCl was then removed by a water wash, and the remaining reaction product mixture was neutralized by the incremental addition of a dilute HCl solution. Finally the volatile components were removed by stripping at 50° C. and 0.6 m.m. of mercury pressure; and the chlorine-containing polyol had a hydroxyl number of 110 mg KOH/g.

The third polyol used, Polyol C, is a mixture of Polyol A and the intermediate chlorinated polyol condensate from which Polyol A was derived, the two components being in a ratio of 1:1 on a weight basis.

EXAMPLE I

The amount of 10 grams of a chlorine-containing polyol which included 99.6 weight percent of Polyol A and 0.4 weight percent of sodium acetate was heated to a temperature of about 50°-60° C. The chlorine-containing polyol was then added to, and mixed with, the amount of 1.74 grams of toluene diisocyanate. This system was allowed to stand at room temperature, and the "gel time" was measured. The "gel time" is the time which lapses after the reactants are mixed until there is no apparent flowing of polyurethane material after a sample is tipped to about a 45 degree angle. The gel time was found to be about 5 minutes.

EXAMPLE II

The procedure of Example I was followed except that the chlorine-containing polyol included 99.8 weight percent of Polyol A and 0.2 weight percent of sodium acetate. The gel time was found to be about 5 to about 10 minutes.

EXAMPLE III

The procedure of Example I was followed except that the chlorine-containing polyol included 99.1 weight percent of Polyol A and 0.1 weight percent of sodium acetate. This system was allowed to stand at room temperature for about 15 minutes without gellation; it was then cured at a temperature of about 100° C., and the gel time was measured. The gel time was found to be about 15 minutes.

COMPARISON I

To determine the effectiveness of using the sodium acetate catalyst in the process as described hereinabove, the procedure of Example I was followed except that no sodium acetate was included in the chlorine-containing polyol. This system failed to gel after 1 hour at a temperature of about 100° C.

EXAMPLE IV

The amount of 100 grams of a chlorine-containing polyol which included 99.6 weight percent of Polyol A and 0.4 weight percent of sodium acetate was heated to a temperature of about 50°-60° C. The chlorine-containing polyol was then added to, and mixed with, the amount of 25.8 grams of methylene bis (phenylisocyanate). The gel time was found to be about 15 seconds at a temperature of about 100° C. An analysis of the cured product using reflectance infrared spectroscopy indicated the presence of a predominate amount of urethane groups with only a trace amount of isocyanurate groups.

EXAMPLE V

The amount of 10 grams of a chlorine-containing polyol which included 99.6 weight percent of Polyol B and 0.4 weight percent of potassium acetate was heated to a temperature of about 50°-60° C. The chlorine-containing polyol was then added to, and mixed with, the amount of 1.51 grams of toluene diisocyanate. The gel time was found to be about 25 minutes at room temperature.

EXAMPLE VI

The amount of 10 grams of a chlorine-containing polyol which included 99.8 weight percent of Polyol C and 0.2 weight percent of sodium acetate was heated to a temperature of about 50°-60° C. The chlorine-containing polyol was then added to, and mixed with, the amount of 1.74 grams of toluene diisocyanate. The system was allowed to stand at room temperature for about 15 minutes without gellation; it was then cured at a temperature of about 100° C., and the gel time was measured. The gel time was found to be about 15 minutes.

What is claimed is:

1. A process for preparing a noncellular polyurethane which comprises reacting an organic polyisocyanate with a chlorine-containing polyol having an average of 2-8 hydroxy groups and at least one (2,2-dichlorovinyl) ethylene group in the polyol chain, said reaction being carried out in the presence of a catalytic amount of a metal carboxylate compound selected from the group consisting of an alkali metal salt of a carboxylic acid, an alkaline earth metal salt of a carboxylic acid and mixtures thereof.

2. The process as recited in claim 1, wherein the metal part of said metal carboxylate compound is selected from the group consisting of lithium, sodium, potassium, magnesium and calcium, and the carboxylic acid part of said metal carboxylate compound is derived from the group consisting of acetic acid, propionic acid, butyric acid, stearic acid, benzoic acid and naphthoic acid.

3. The process as recited in claim 2, wherein said metal carboxylate compound is sodium acetate, potassium acetate or a mixture thereof.

4. The process as recited in claim 1, wherein aid chlorine-containing polyol has an average of 2-3 hydroxy groups and contains about 1-5 of said (2,2-dichlorovinyl) ethylene groups per every hydroxy group.

5. The process as recited in claim 1, wherein said chlorine-containing polyol is comprised of the product of first condensing a polyhydroxy initiator with 4,4,4-trichloro-1,2-epoxybutane or a mixture thereof with a halogen-free epoxide to form an intermediate chlorinated polyol condensate followed by dehydrochlorinating said condensate.

6. The process as recited in claim 5, wherein said polyhydroxy initiator is glycerol, ethylene glycol or a mixture thereof.

7. The process as recited in claim 6, wherein said metal carboxylate compound is sodium acetate, potassium acetate or a mixture thereof.

8. The process as recited in claim 1, wherein said organic polyisocyanate is toluene diisocyanate, methylene bis(phenylisocyanate) or a mixture thereof.

9. The process as recited in claim 8, wherein said chlorine-containing polyol has an average of 2-3 hydroxy groups and contains about 1-5 of said (2,2-dichlorovinyl) ethylene groups per every hydroxy group.

10. The process as recited in claim 9, wherein said chlorine-containing polyol is comprised of the product of first condensing a polyhydroxy initiator with 4,4,4-trichloro-1,2-epoxybutane or a mixture thereof with a halogen-free epoxide to form an intermediate chlorinated polyol condensate followed by dehydrochlorinating said condensate.

11. The process as recited in claim 10, wherein:
said first step, in the preparation of said chlorine-containing polyol, comprises condensing a polyhydroxy initiator first with 4,4,4-trichloro-1,2-epoxybutane and then with ethylene oxide or propylene oxide;
said polyhydroxy initiator is glycerol, ethylene glycol or a mixture thereof; and
said metal carboxylate compound is sodium acetate, potassium acetate or a mixture thereof.

12. A noncellular polyurethane prepared according to the process of claim 1.

13. A noncellular polyurethane prepared according to the process of claim 4.

14. A noncellular polyurethane prepared according to the process of claim 11.

* * * * *